United States Patent Office 3,122,160
Patented Feb. 25, 1964

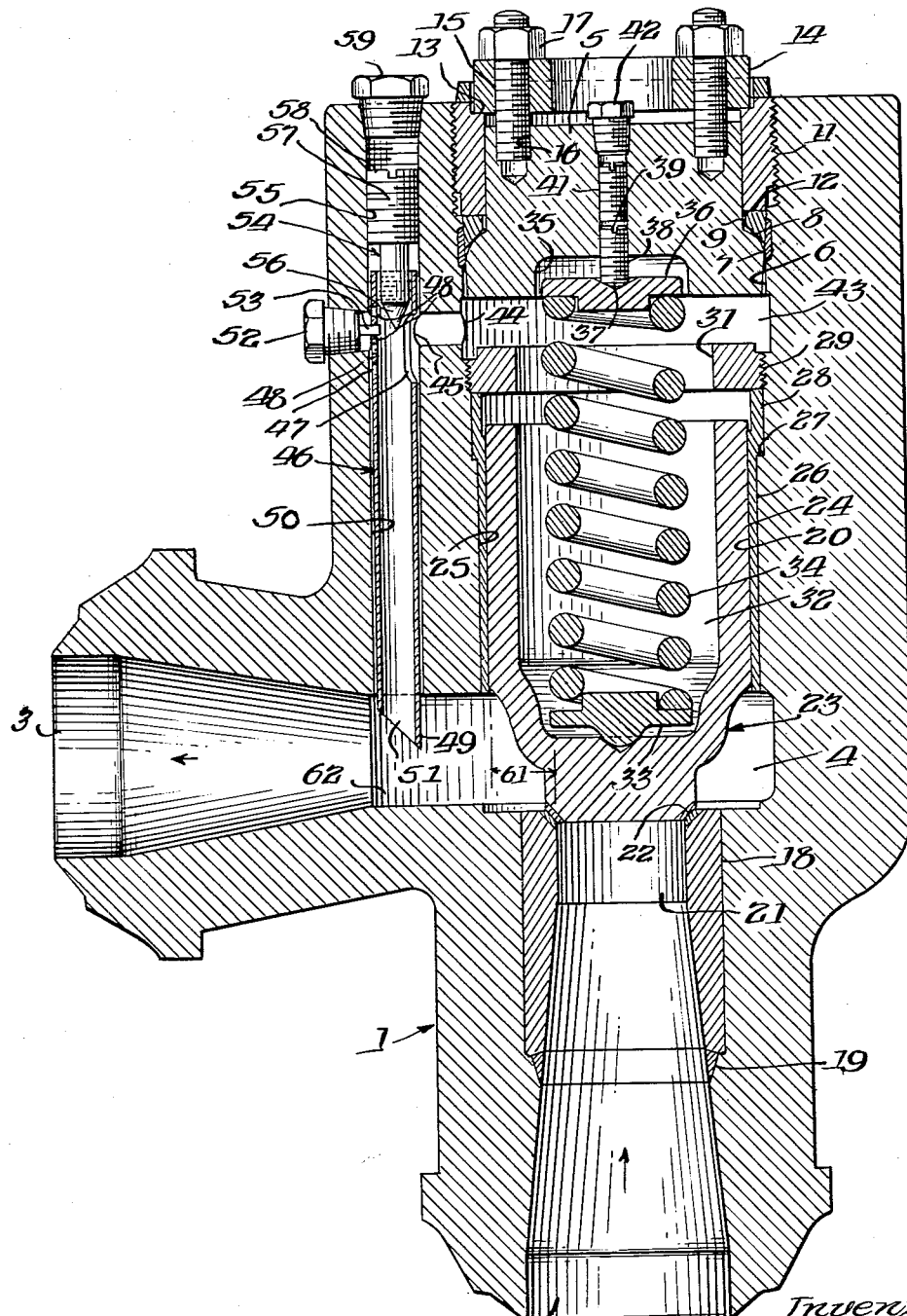

3,122,160
ADJUSTABLE PRESSURE SETTING ARRANGE-
MENT FOR PRESSURE RESPONSIVE VALVES
Edward W. Carr, Cicero, Edmond P. De Craene, West-
chester, and Ivan J. Acosta, Chicago, Ill., assignors to
Crane Co., Chicago, Ill., a corporation of Illinois
Filed June 20, 1962, Ser. No. 203,822
8 Claims. (Cl. 137—484.2)

This invention relates generally to a novel pressure responsive valve, and, more specifically, it is directed to a spring loaded piston type lift check valve with a novel adjustable pressure setting arrangement incorporated therein. The said adjustable pressure setting means comprises an adjustable pressure relieving by-pass built therein.

At the outset, in order to have a better appreciation of the background of this invention, it should be understood that in pressure responsive valves, such as lift check valves or the like, the spring biased valve closure member will not rise or lift in proportion to the pressure increase. Therefore to offset the increase in load which occurs as the spring is compressed, supplemental loads are frequently used. These are of the type represented by devices providing deliberately created piston areas responsive to the secondary fluid pressures within the valve body.

Thus, one of the serious objections heretofore encountered in valves of this type is that because of variation in flow characteristics, flow rates and varying spring loads, either singly or together, combine to make it virtually impossible to predict the valve performance accurately in service. It will, of course, be understood that by resorting to unusual specific valving modifications in detail construction which is known to those skilled in the art as "over design" guaranteed unseating of the valve can generally be accomplished, but reseating of the valve even under such circumstances would become indefinite. Further, if the opposing biasing forces encountered in the course of service are not properly balanced, valve unseating and reseating in rapidly reseating cycles will occur. This objectionable valve closure performance is commonly referred to as chattering and it is not only hazardous, but also costly.

It is therefore one of the more important objects of this invention to provide for a valve construction in which the objections above referred to are overcome or substantially minimized.

It is another important object therefore to provide in a valve construction for economical compactness and to permit adjustment of mechanical and fluid pressure loads in a novel design of valve incorporating an adjustable internal and preferably integral pressure relieving by-pass as will hereinafter be explained in greater detail.

It should be understood in this connection that in a valve of this type the valve closure member will rise from its seat, preferably to open the valve equivalent to a full area lift within a given range of what is termed pressure drop across the valve seat opening and to reseat when the inlet pressure to which the valve is subjected in service drops to a predetermined pressure head. In considering this invention, it should therefore be understood that in valves of this character, fluid flow to the valve inlet results in an increase in fluid pressure which will predeterminately cause the valve closure member to lift.

Another important object is to provide for a valve construction of the character described in which the pressure differential existing within the valve casing above and below the valve closure member seat is easily and conveniently controlled to a proper level. Preferably, it is provided with a plurality of means for changing the initial pressure differential and/or changing flow channel sizes as will hereinafter be described in detail and made clear.

Other objects and advantages will become more readily apparent upon proceeding with the following description read in light of the accompanying drawing in which in the single figure illustrated an embodiment of our invention is shown in a pressure responsive valve, such as a spring biased lift check valve, although capable of being used in other types of valves, such as stop check valves.

Referring now to the drawing, a valve body or casing generally designated 1 is shown having the usual inlet 2 and the discharge or outlet 3, as indicated by the arrows. The valve casing intermediate said inlet and outlet has a valve chamber 4 provided therein and is capped in the conventional manner as by a cover 5 fitted snugly within the casing opening 6 and with an annular portion thereof being preferably faced annularly as at 7 with a wear resisting ring. The cover 5 has a shoulder portion 8 preferably, but not necessarily, of rounded configuration as illustrated to receive a sealing ring 9, the latter member preferably being of straight sided substantially frusto-conical form, thereby forming a line bearing fluid seal between the ring 9 and the shoulder portion 8 of the cover of the body. In order to retain the sealing ring 9 firmly in position against said shoulder 8, a threaded retainer 11 is applied as indicated to bear against the upper annular surface 12 of the ring 9, the said retainer ring 11 at an upper portion thereof being recessed as at 13 to form a shoulder for the reception and support of the outer ring 14. Circumferentially positioned in spaced-apart relation on the said outer ring 14, a plurality of threaded studs 15 engage the cover 5 as at 16 whereby to draw the ring 9 upwardly or outwardly against the retainer ring 11 in making the fluid sealing joint referred to. The adjustability of such initial sealing of the ring 9 with relation to the members 5 and 11 is conveniently accomplished by means of suitable nuts 17 engaging the studs 15.

Immediately below the valve chamber 4, an annular valve seat ring 18 is preferably provided and is weld-attached as at 19 to the valve casing. It will of course be appreciated that such means of attachment may be done in ways other than welding, as, for example, by threads, brazing or otherwise, without in any way affecting the application of this invention. At an inner portion of the seat 18, the port 21 is provided, the upper limit of which is defined by a valve seat 22, the latter preferably, but not necessarily, having a hardened seat material as indicated, to cooperate with a valve closure member generally designated 23 to provide valve closed position. The said closure member at its upper portion is provided with a piston-like hollow extension 24 which may be fitted snugly within the casing 4 directly as indicated at 25. Or, as illustrated, it may be desirable in providing improved wear characteristics in the valve to interpose a liner or sleeve 26 between the outer annular surface of the closure member 23 and the casing bore 25 which defines the outer limits of the valve chamber portion receiving the piston 24 of said closure member.

As will hereinafter be made clear, preferably between the respective inner and outer surfaces 20 of the sleeve 26 and said outer annular surface of the closure member and casing respectively an annular clearance for the sleeve is provided therebetween preferably described by those skilled in the art as a sliding fit.

In order to support the said sleeve 26 suitably within the casing, the latter member is annularly shouldered as at 27 to receive the upper annular thickened portion 28 of the sleeve 26.

In order to hold the sleeve 26 firmly in position against the shoulder 27 as indicated, an inner threaded retaining ring 29 is provided, apertured as at 31 for reasons hereinafter explained. The said retaining ring bears against the upper limits of the portion 28 to accomplish the retention function previously referred to insofar as the sleeve 26 is concerned. In addition, it serves to mechanically limit the disc lift to heights predetermined to provide full flow area for line fluid.

The valve closure member 23 is provided with a chamber 32 within the said piston, receiving at the inner limits thereof the spring washer member 33, the latter member being suitably formed to receive the coiled spring 34 as shown. At the upper limits of the said spring and received within a hollow portion of the cover 5 as indicated at 35 an upper spring washer member 36 is received as shown. The member 36 is suitably recessed as at 37 to receive a spring adjusting screw 38. It will be understood that the latter member during the course of providing the factory setting of the valve exerts the necessary compression or spring load by the spring member 34 and preferably, but not necessarily, has the screw driver slot 39 to effect such load adjustment. In order to lock the adjusting screw 38 against rotation, a slotted locking screw 41 is employed and to guard against any tampering of the adjusting screw as well as the lock screw, a lock plug 42 is used as illustrated. It will be appreciated that in addition to eliminating the possibility of tampering the locking plug 42 also serves as a fluid pressure retaining member.

It will be apparent that between the inner surface limits of the cover 5 and the sleeve retaining member 29, an annular valve chamber portion 43 is provided which in connection with the functioning of the valve of this invention accomplishes a significant part. In this connection, it should be realized that the chamber 43 during the normal course of valve operation must necessarily contain line fluid pressure, a small portion of which represents the discharge through the valve in response to the pressure setting when the said closure member leaves the seat contact at 22 under predetermined load. At a portion of its periphery, the retaining wall of the casing 1 is transversely ported at 44 to communicate at its inner limit with the said chamber 43 and at its outer end portion 45 the port 44 communicates with an adjustable ported aspirator tube functioning as a by-pass generally designated 46, the details of which will now be described.

The aspirator is provided at a portion immediately adjoining the transverse port 44, with the orifice 47, the purpose of which is to provide for the entrance of the line fluid from the valve chamber 43. Preferably, at an opposite disposed end portion thereof and in order to provide for the aspirator adjustability referred to, the said aspirator tube is provided along its axial length with a number of predeterminately spaced-apart transverse holes designated 48. It will be understood that the function of these holes and their axial spacing is to allow for the desired axial adjustment in the positioning of the ported aspirator tube 46. In this connection, it should be appreciated that the lower tip of the aspirator tube 46, as indicated at 49, projects within the port 62 and therefore lies in the flow path of the fluid discharge from the valve as indicated by the arrow, the end thereof preferably being cut on the bias as indicated at 51 to provide the desired aspiratory effect with relation to the fluid flow referred to. The tube 46 is thus fitted within the casing opening 50 in sliding fit relationship to permit said axial positioning adjustment.

In critical cooperative relationship to the open end of the opening 50, the adjusting plug 52 is provided with the inwardly extending integral spud 53 for selectively engaging one of the holes 48 depending upon the desired axial position of the aspirator tube 46 predeterminately found desirable in relation to the discharge ports 3 and 62 of the valve casing. It will, of course, also be appreciated that by virtue of the cooperation between the adjusting plug 52 and spud 53 with the holes 48 of the aspirator 46, a substantial number of adjustments in pressure differential are easily provided by nicely controlling the projection of the portion 49 within the discharge port of the valve.

For the same reason and in equally accurate adjustment in relation to the fluid flow through the aspirator, at the upper portion of the threaded cylindrical chamber 50, a needle valve generally designated 54 is mounted upon the threaded portion 55 whereby to impart the desired axial positioning of the preferably non-seating needle valve member 56 with relation to its axial position to the transverse port 47 of the aspirator tube. It will be clear that by virtue of such needle valve adjustability axially, suitable allowance is made for throttling the flow from the valve chamber 43 to the by-pass chamber defined at 50. For the same reason and in substantially the same manner as provided in connection with the spring 34 adjustability previously referred to, convenient access to the screw driver slot 57 is accomplished by means of the slotted lock screw 58 and a fluid pressure retaining plug 59.

In now considering the operation of the valve embodying the pressure differential adjustment means of this invention, it should be appreciated that fluid flow through the inlet of the valve port as at 21 takes place with the valve suitably mounted on a pressure vessel or pipe line and occurs as a result of an increase in pressure which normally causes the valve closure member 23 to lift correspondingly to provide pressure relief. Secondary fluid pressure is formed in the valve chamber 4 which acts against area above the valve seat and as represented by the numeral 61, the area extending between that chamber portion formed by the piston and closure overhang as shown. The valve chamber 4 communicates with the chamber portion 43 through the annular clearance previously referred to between the piston of the closure member and the inner surface of the sleeve 26. Said clearance is provided by the peripheral surfaces 24 and 20 respectively of the closure member 23 and the liner 26 and allows a fluid pressure head to be created in the chamber 43 above the said closure member. The fluid pressure within the chamber 43 must be controlled in order to insure proper effectiveness of the line fluid inlet pressure acting against the area defined by the numeral 61 and it has been found that the control hereinabove described makes it possible to provide effort which will neutralize the effect of the spring 34 to increase its load as it is being compressed when the closure member 23 is lifted in response to fluid pressure within a pipe line or pressure vessel.

In order to accelerate fluid flow discharge from the chamber 43, the lower tip of the aspirator tube 46 is predeterminately positioned in the path of the discharging fluid stream as designated by the numeral 62 and with the inclined cut and egress opening or aspirator port 51 facing downstream. Thus, a drop in pressure is created, this being due to the aspirator effect provided by the projection of the tube 46 within the discharge chamber 62. The pressure within the chamber 43 thus provides the necessary pressure differential between such pressure in said chamber and the pressure within the chamber adjacent and within the aspirator port 51. It is to control said pressure differential to a proper and desired level that the structural means above described have been devised which permits of changing the initial pressure differential and/or changing flow channel sizes through the aspirator tube 46. In this connection, of course, it will be appreciated that the size, the length and the diameter of said aspirator tube as well as the dimensions of the needle control valve cooperating therewith may be suitably changed in form and differing substantially from that illustrated. In order to provide such control, this is easily done by entering and mounting such modified forms of the aspirator through the opening normally closed by the plug 59 and placing such forms axially as desired.

It will also be clear that under the construction described, the aspirator tube 46 can be raised or lowered to re-position selectively the lower tip at 51 in the flow path provided by the chamber 62 as desired, depending upon field conditions encountered. It provides an infinite number of structural changes to valve and vary the pressure differential. Additionally, and as previously indicated, adjustment can be made in the axial positioning of the needle valve. It will of course be appreciated that the shape and the size of the orifice 47 is of such proportions as to allow for the axial positioning of the aspirator 46 in relation to its functioning in cooperation with the valve chamber 43 communicating therewith through the port portions 44 and 45.

It will be further appreciated that the aspirator tube 46 can optionally be made of such materials having desirable corrosion and erosion resisting characteristics depending upon the nature of the service encountered in the field.

While only a single embodiment has been illustrated and described, the invention is therefore capable of being used in many widely different forms without departing from the spirit of the invention as defined by the appended claims.

We claim:
1. In a fluid pressure responsive valve;
the combination of a valve casing with an inlet and outlet and a movable closure member therefor normally seated between said inlet and outlet;
the said valve casing having an annular chamber for said closure member;
resilient means within said chamber and supported within a recessed portion of the said closure member;
the latter recessed portion being defined by a piston-like portion of the said closure member fitting in said valve chamber for reciprocating movement of said closure member;
cover means for said casing chamber;
the said casing having a constantly open passageway between an upper portion of the said closure member and said cover means;
the said passageway at an opposite limit portion communicating with said casing outlet;
an aspirator ported tube fitted within said passageway having an end portion with an inclined cut and an egress opening extending into and facing the downstream portion of the casing outlet;
the said aspirator tube having a substantially transverse port communicating with the annular chamber of the casing;
said aspirator tube reducing the fluid pressure in the casing chamber above said closure member;
adjustable means on the casing for axially positioning the said aspirator tube to regulate the fluid pressure differential between said casing chamber above the closure member and the casing outlet.

2. The subject matter of claim 1;
valve means in the casing passageway cooperating with an opposite end portion of said aspirator tube to throttle fluid flow from said valve chamber above said closure member through said aspirator tube.

3. The subject matter of claim 2;
said valve means comprising a needle valve construction axially movable in cooperation with said transverse port of the aspirator tube to regulate said fluid pressure differential.

4. The subject matter of claim 2;
said aspirator tube transverse port being elongated sufficiently in an axial direction to permit movement of said tube in an axial direction without closing said port.

5. The subject matter of claim 1;
the said aspirator tube having a constantly open valve means cooperating therewith.

6. The subject matter of claim 5; the said constantly open valve means having an axial movement measured at least by the length of the transverse port of said aspirator tube.

7. The subject matter of claim 1;
the said adjustable means on the casing having means thereon for effecting substantially transverse engagement with the said aspirator tube to adjust and establish the axial position of said tube relative to the outlet of said casing.

8. The combination in a pressure responsive valve;
a valve casing having an inlet and outlet and a movable closure member normally seated therebetween;
said movable closure member and casing forming an annular chamber above said closure member;
adjustable pressure setting means for said closure member comprising an adjustable pressure relieving by-pass communicating with said outlet portion and said chamber;
the said by-pass including an aspirator tube at one side of the casing positioned substantially parallel to the valve central axis with a transverse ported portion thereof communicating with said annular chamber in said casing above said closure member and a reciprocally movable valve closure member within said aspirator tube cooperating with said transverse ported portion of said aspirator tube to regulate the volume of the relieved fluid flow through the aspirator tube into said outlet of the valve;
the said aspirator tube member projecting within said outlet and being axially adjustable in its positioning in said by-pass;
the means providing for the latter axial adjustability being positioned on the said casing adjacent said second named closure member in the aspirator tube and extending within said casing and tube member in a plane substantially opposite said transverse ported portion of said aspirator tube.

References Cited in the file of this patent
UNITED STATES PATENTS

| | | |
|---|---|---|
| 1,685,866 | Raymond | Oct. 2, 1928 |
| 2,417,994 | Sheets | Mar. 25, 1947 |
| 2,504,470 | Trautman | Apr. 8, 1950 |
| 2,706,409 | Preston | Apr. 19, 1955 |
| 2,886,058 | Horton | May 12, 1959 |